US008583657B2

(12) United States Patent
Shukla

(10) Patent No.: US 8,583,657 B2
(45) Date of Patent: Nov. 12, 2013

(54) METHOD AND APPARATUS FOR USING A HASH-PARTITIONED INDEX TO ACCESS A TABLE THAT IS NOT PARTITIONED OR PARTITIONED INDEPENDENTLY OF THE HASH PARTITIONED INDEX

(75) Inventor: Vikram Shukla, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 522 days.

(21) Appl. No.: 10/857,650

(22) Filed: May 28, 2004

(65) Prior Publication Data

US 2005/0251524 A1    Nov. 10, 2005

Related U.S. Application Data

(60) Provisional application No. 60/569,122, filed on May 6, 2004.

(51) Int. Cl.
*G06F 17/30* (2006.01)

(52) U.S. Cl.
CPC .............................. *G06F 17/30017* (2013.01)
USPC ......................................... 707/747; 707/796

(58) Field of Classification Search
USPC ............ 707/2, 102, 100, 104.1, 999.2, 999.1, 707/999.104, 747, 713, 718, 658, 765, 766, 707/769, 770, 796
See application file for complete search history.

(56) References Cited

U.S. PATENT DOCUMENTS

| 4,611,272 | A | * | 9/1986 | Lomet | 707/3 |
|---|---|---|---|---|---|
| 5,404,510 | A | * | 4/1995 | Smith et al. | 707/2 |
| 5,511,190 | A | * | 4/1996 | Sharma et al. | 707/1 |
| 5,515,531 | A | * | 5/1996 | Fujiwara et al. | 1/1 |
| 5,551,027 | A | * | 8/1996 | Choy et al. | 707/201 |
| 5,553,218 | A | * | 9/1996 | Li et al. | 707/102 |
| 5,625,815 | A | * | 4/1997 | Maier et al. | 707/8 |
| 5,878,409 | A | * | 3/1999 | Baru et al. | 707/2 |
| 5,960,194 | A | * | 9/1999 | Choy et al. | 707/102 |
| 5,960,431 | A | * | 9/1999 | Choy | 707/7 |
| 6,092,061 | A | * | 7/2000 | Choy | 707/1 |
| 6,175,835 | B1 | * | 1/2001 | Shadmon | 707/102 |
| 6,216,125 | B1 | * | 4/2001 | Johnson | 707/4 |
| 6,223,171 | B1 | * | 4/2001 | Chaudhuri et al. | 707/2 |
| 6,226,629 | B1 | * | 5/2001 | Cossock | 1/1 |
| 6,353,820 | B1 | * | 3/2002 | Edwards et al. | 707/2 |

(Continued)

OTHER PUBLICATIONS

Gennario, Claudio, et al., "Similarity Search in Metric Databases Through Hashing", Proceedings of the 2001 ACM Workshops on Multimedia: Multimedia Information Retrieval, Ottawa, Canada, Sep. 2001, pp. 1-5.*

(Continued)

*Primary Examiner* — Jean B Fleurantin
(74) *Attorney, Agent, or Firm* — Shun Yao; Park, Vaughan, Fleming & Dowler LLP

(57) ABSTRACT

One embodiment of the present invention provides a system that uses an index that is hash-partitioned to access a table that is not hash-partitioned. During system operation, the database receives a request to perform an operation involving a table in the database. If performing the operation involves looking up a key in the hash-partitioned index, the database applies a hash function to the key to identify a unique partition within the hash-partitioned index for the key, and uses the key to perform a lookup in the identified partition to identify zero or more rows of the table that match the key.

42 Claims, 7 Drawing Sheets

(56) References Cited

U.S. PATENT DOCUMENTS

| | | | |
|---|---|---|---|
| 6,366,903 B1* | 4/2002 | Agrawal et al. | 707/2 |
| 6,389,410 B1* | 5/2002 | Gupta | 707/2 |
| 6,438,562 B1* | 8/2002 | Gupta et al. | 707/201 |
| 6,470,333 B1* | 10/2002 | Baclawski | 707/3 |
| 6,473,774 B1* | 10/2002 | Cellis et al. | 707/200 |
| 6,505,189 B1* | 1/2003 | On Au et al. | 707/2 |
| 6,516,320 B1* | 2/2003 | Odom et al. | 707/101 |
| 6,557,014 B1* | 4/2003 | Cellis et al. | 707/205 |
| 6,578,039 B1* | 6/2003 | Kawamura | 707/100 |
| 6,609,131 B1* | 8/2003 | Zait et al. | 707/102 |
| 6,618,729 B1* | 9/2003 | Bhashyam et al. | 707/101 |
| 6,622,138 B1* | 9/2003 | Bellamkonda et al. | 707/2 |
| 6,665,684 B2* | 12/2003 | Zait et al. | 707/102 |
| 6,772,163 B1* | 8/2004 | Sinclair et al. | 707/100 |
| 6,823,377 B1* | 11/2004 | Wu et al. | 709/223 |
| 6,845,375 B1* | 1/2005 | Sinclair | 707/100 |
| 6,920,460 B1* | 7/2005 | Srinivasan et al. | 707/102 |
| 6,944,633 B1* | 9/2005 | Higa et al. | 707/104.1 |
| 7,047,250 B1* | 5/2006 | Agarwal et al. | 707/102 |
| 7,054,852 B1* | 5/2006 | Cohen | 707/2 |
| 7,080,072 B1* | 7/2006 | Sinclair | 707/6 |
| 7,113,957 B1* | 9/2006 | Cohen et al. | 707/102 |
| 7,136,861 B1* | 11/2006 | Sinclair et al. | 707/101 |
| 7,158,996 B2* | 1/2007 | Croisettier et al. | 707/103 R |
| 7,299,239 B1* | 11/2007 | Basu et al. | 707/102 |
| 7,454,516 B1* | 11/2008 | Weinert et al. | 709/235 |
| 7,472,107 B2* | 12/2008 | Agrawal et al. | 707/2 |
| 2002/0194157 A1* | 12/2002 | Zait et al. | 707/2 |
| 2003/0004938 A1* | 1/2003 | Lawder | 707/3 |
| 2003/0055822 A1* | 3/2003 | Yu | 707/6 |
| 2003/0058277 A1* | 3/2003 | Bowman-Amuah | 345/765 |
| 2003/0074348 A1* | 4/2003 | Sinclair et al. | 707/2 |
| 2004/0148273 A1* | 7/2004 | Allen et al. | 707/2 |
| 2004/0148293 A1* | 7/2004 | Croisettier et al. | 707/100 |
| 2004/0199533 A1* | 10/2004 | Celis et al. | 707/101 |
| 2004/0260684 A1* | 12/2004 | Agrawal et al. | 707/3 |
| 2005/0050050 A1* | 3/2005 | Kawamura | 707/100 |

OTHER PUBLICATIONS

Reynolds, Patrick, et al., "Efficient Peer-to-Peer Keyword Searching", Middleware 2003, LNCS 2003, © 2003, pp. 21-40.*

Zeller, Bernhard, et al., "Exploiting Advanced Database Optimization Features for Large-Scale SAP R/3 Installations", Proceedings of the 28th International Conference on Very Large Data Bases, Hong Kong, © 2002, pp. 894-905.*

Chen, Ming-Syan, et al., "Optimal Design of Multiple Hash Tables for Concurrency Control", IEEE Transactions on Knowledge and Data Engineering, vol. 9, No. 3, May/Jun. 1997, pp. 384-390.*

Shahzad, Muhammad Ahmad, "Data Warehousing With Oracle", Internet Archive (Wayback Machine), dtd: May 2, 2003, pp. 1-18 (downloaded from: web.archive.org/web/20030502171314/http://www.oracular.com/white_paper_pdfs/DataWarehousingwithOracle.pdf).*

Chervenak, Ann, et al., "Giggle: A Framework for Constructing Scalable Replica Location Services", Proceedings of the 2002 ACM/IEEE Conference on Supercomputing, Baltimore, MD, © 2002, pp. 1-17.*

Leverenz, Lefty, et al., "Chapter 8: Partitioned Tables and Indexes, Oracle8 Server Concepts", Release 8.0, Part No. A54643-01, Oracle Corp., Jun. 1997, pp. 8-1 to 8-40.*

Banerjee, Sandeepan, et al., "All Your Data: The Oracle Extensibility Architecture", Component Database Systems, Morgan Kaufmann Publisher, © 2001, pp. 1-32.*

Ghandeharizadeh, Shahram, et al., "Magic: A Multiattribute Declustering Mechanism for Multiprocessor Database Machines", IEEE Transactions on Parallel and Distributed Systems, vol. 5, No. 5, May 1994, pp. 509-524.*

Valduriez, Patrick, "Parallel Database Systems: Open Problems and New Issues", Distributed and Parallel Databases, vol. 1, Kluwer Academic Publishers, Boston, MA, © 1993, pp. 137-165.*

Zeller, Bernhard, et al., "Experience Report: Exploiting Advanced Database Optimization Features for Large-Scale SAP R/3 Installations", Proc. of the 28th VLDB Conf., Hong Kong, China, © 2002, pp. 894-905.*

Shahzad, Muhammad A., "Data Warehousing with Oracle", Proc. Of SPIE, vol. 3695, Orlando, FL, Apr. 5, 1999, pp. 179-190.*

Cooper, Brian F., et al., "A Parallel Index for Semistructured Data", SAC 2002, Madrid, Spain, © 2002, pp. 890-896.*

Lehman, Tobin J., "A Study of Index Structures for Main Memory Database Management Systems", Proc. of the 12th International Conf. on VLDB, Kyoto, Japan, Aug. 1986, pp. 294-303.*

Lomet, David B., "Bounded Index Exponential Hashing", TODS, vol. 8, Issue 1, Mar. 1983, pp. 136-165.*

Farazdel, Abbas, et al., "Oracle8i Parallel Server on IBM SP Systems: Implementation Guide", IBM Redbooks, SG24-5591-00, Dec. 1999, pp. cover, i-ii, 56-60, 119-120 and 122.*

Microsoft Computer Dictionary, 5th Edition, Microsoft Press, Redmond, WA, © 2002, pp. 269-270.*

Baylis, Ruth, et al., Oracle Database Administrator's Guide 10g Release 1 (1o.1), Part No. B10739-01, Oracle Corp., Redwood City, CA, Dec. 2003, 147 pages.*

Dan Greene et al,. Multi-Index Hashing for Information Retrieval, 1994, IEEE, 722-731.*

* cited by examiner

METHOD AND APPARATUS FOR USING A HASH-PARTITIONED INDEX TO ACCESS A TABLE THAT IS NOT PARTITIONED OR PARTITIONED INDEPENDENTLY OF THE HASH PARTITIONED INDEX

This application hereby claims priority under 35 U.S.C. §119 to U.S. Provisional Patent Application No. 60/569,122 filed on 6 May 2004, entitled "Eliminating Resource Contention During Maintenance of an Index Defined on Monotonically Increasing Keys," by inventor Vikram Shukla.

BACKGROUND

1. Field of the Invention

The present invention relates to the process of accessing a table within a database system. More specifically, the present invention relates to a method and an apparatus for using a hash-partitioned index to access a table that is not hash-partitioned.

2. Related Art

Many database applications use automatically generated keys as column values in relation tables. In such applications, the automatically generated key typically has a monotonically increasing value. For example, the transaction identifier in an Online Transaction Processing (OLTP) environment is usually an automatically generated key that is incremented to generate successive key values. Similarly, surrogate keys that are used in star schemas of data warehousing environments also tend to be automatically generated with monotonically increasing values.

Often, these automatically generated keys with monotonically increasing values have indexes defined on them. As a result, index accesses and maintenance activities tend to occur in a highly localized area of the index (e.g., the right-most edge of the index). These localized areas are known as "hotspots." A hotspot can cause severe resource contention during periods of increased database activity, which can result in a performance degradation of the database system, such as, an increased response time for database transactions and reduced throughput.

Two methods are presently used to reduce hotspots. The first method reverses the bytes in the key and then uses the reversed key to perform operations in the index. This method largely eliminates the formation of hotspots because it disperses the reversed keys across the whole index. One of the drawbacks of this approach is that since it disperses the reversed keys in a highly random fashion, it causes continuous random movement of the disk head, which causes the disk seek-time to increase considerably because locality-of-reference is lost. Thus, although this method eliminates hotspots, it may, in fact, degrade the overall performance of the system. The second method is to use hash-partitioned tables, in which rows are mapped into partitions based on applying the hash function to the partitioning key. Since each partition of a hash-partitioned table has its own index, the index accesses and maintenance activities are equally distributed among all the partitions, thereby eliminating the formation of a single large hotspot. The drawback of this method is that it forces the user to partition tables using the hash-partitioning technique, which may not be the optimal partitioning technique for certain database applications. For example, in OLTP applications, it is quite common to use range-partitioned tables that are partitioned using the date fields for simplifying database management and for improving database performance. Thus, for such applications, we cannot use hash-partitioning to eliminate hotspots.

Hence, what is needed is a method and an apparatus for accessing a table that does not have the above-described drawbacks of the existing techniques.

SUMMARY

One embodiment of the present invention provides a system that uses an index that is hash-partitioned to access a table that is not hash-partitioned. During system operation, the database receives a request to perform an operation involving a table in the database. If performing the operation involves looking up a key in the hash-partitioned index, the database applies a hash function to the key to identify a unique partition within the hash-partitioned index for the key. Next, the database uses the key to perform a lookup in the identified index partition to identify zero or more rows of the table that match the key.

In a variation on this embodiment, the table is not partitioned.

In a variation on this embodiment, the table is range-partitioned.

In a variation on this embodiment, the table is list-partitioned.

In a variation on this embodiment, the operation can include: querying the table to identify rows that match a logical condition; updating an existing row in the table; deleting an existing row in the table; inserting a new row in the table; creating a hash-partitioned index for the table; adding a partition to the hash-partitioned index; and coalescing a partition in the hash-partitioned index.

In a variation on this embodiment, the hash function is applied to a prefix of the key, instead of the entire key.

In a variation on this embodiment, identifying a unique partition for the key involves calculating a partition number.

In a variation on this embodiment, if performing the operation involves creating a hash-partitioned index, the database first obtains a key for each row in the table. Then, it applies a hash function to the key to identify a unique partition within the hash-partitioned index for the key. Finally, it inserts the key into the identified partition.

In a variation on this embodiment, if performing the operation involves adding a partition to the hash-partitioned index, and if the hash function has the prefix property, the database identifies a source partition in the hash-partitioned index to be subdivided to create two new partitions to replace the source partition. If the source partition is marked usable, the system then subdivides the source partition by first scanning through all the keys in the source partition, applying a new hash function to each key in the source partition to identify one of the two new partitions, and inserting the key into the identified new partition. Finally, it replaces the source partition with the two new partitions, thereby creating an additional partition.

In a variation on this embodiment, if performing the operation involves adding a partition to the hash-partitioned index, and if the hash function has the prefix property, the database identifies a source partition in the hash-partitioned index to be subdivided to create two new partitions to replace the source partition. If the source partition is marked unusable, the system then attempts to identify a second index, wherein the index key of the second index is a superset of the index key of the hash-partitioned index. If a second index is successfully identified, the system then subdivides the source partition by first scanning through one or more keys in the second index and applying the hash function to each key to determine whether the key maps to the source partition. Next, if the key maps to the source partition, the system applies a new hash function to the key to identify one of the two new partitions, and inserts the key into the identified new partition. Finally, it replaces the source partition with the two new partitions, thereby creating an additional partition.

In a variation on this embodiment, if performing the operation involves adding a partition to the hash-partitioned index, and if the hash function has the prefix property, the database identifies a source partition in the hash-partitioned index to be subdivided to create two new partitions to replace the source partition. If the source partition is marked unusable, the system then subdivides the source partition by first scanning through all the rows in the table, obtaining a key for each row, and applying the hash function to the key to determine whether the key maps to the source partition. Next, if the key maps to the source partition, the system applies a new hash function to the key to identify one of the two new partitions, and inserts the key into the identified new partition. Finally, it replaces the source partition with the two new partitions, thereby creating an additional partition.

In a variation on this embodiment, if performing the operation involves adding a partition to the hash-partitioned index, and if the hash function does not have the prefix property, the database creates a set of new partitions to replace the set of existing partitions, wherein the number of new partitions is one greater than the number of existing partitions. It then scans through all the keys in the existing partitions, applies a new hash function to each key to identify a unique partition within the set of new partitions for the key, and inserts the key into the identified partition. Finally, it replaces the existing set of partitions with the new set of partitions, thereby increasing the number of partitions by one.

In a variation on this embodiment, if performing the operation involves adding a partition to the hash-partitioned index, and if the hash function does not have the prefix property, the database creates a set of new partitions to replace the set of existing partitions, wherein the number of new partitions is one greater than the number of existing partitions. It then scans through all the rows in the table, obtains a key for each row, applies a new hash function to the key to identify a unique partition within the set of new partitions for the key, and inserts the key into the identified partition. Finally, it replaces the existing set of partitions with the new set of partitions, thereby increasing the number of partitions by one.

In a variation on this embodiment, if performing the operation involves coalescing a partition in the hash-partitioned index, and if the hash function has the prefix property, the database identifies two source partitions in the hash-partitioned index that share the same prefix to be coalesced to create a single new partition. It then coalesces the two source partitions to create the new partition by scanning through all the keys in the two source partitions, and inserting the keys into the single new partition. Finally, it replaces the two source partitions with the new partition, thereby reducing the number of partitions by one.

In a variation on this embodiment, if performing the operation involves coalescing a partition in the hash-partitioned index, and if the hash function has the prefix property, the database identifies two source partitions in the hash-partitioned index that share the same prefix to be coalesced to create a single new partition. If at least one of the two source partitions is marked unusable, the system then attempts to identify a second index, wherein the index key of the second index is a superset of the index key of the hash-partitioned index. If a second index is successfully identified, the system then coalesces the two source partitions by first scanning through one or more keys in the second index and applying the hash function to each key to determine whether the key maps to one of the source partitions. Next, if the key maps to one of the source partitions, the system inserts the key into the new partition. Finally, it replaces the two source partitions with the new partition, thereby reducing the number of partitions by one.

In a variation on this embodiment, if performing the operation involves coalescing a partition in the hash-partitioned index, and if the hash function has the prefix property, the database identifies two source partitions in the hash-partitioned index that share the same prefix to be coalesced to create a single new partition. If at least one of the two source partitions is marked unusable, the system then coalesces the two source partitions by first scanning through all the rows in the table, obtaining a key for each row, and applying the hash function to the key to determine whether the key maps to one of the source partitions. Next, if the key maps to one of the source partitions, the system inserts the key into the new partition. Finally, it replaces the two source partitions with the new partition, thereby reducing the number of partitions by one.

In a variation on this embodiment, if performing the operation involves coalescing a partition in the hash-partitioned index, and if the hash function does not have the prefix property, the database creates a set of new partitions to replace the set of existing partitions, wherein the number of new partitions is one less than the number of existing partitions. It then scans through all the keys in the existing partitions, applies a new hash function to each key to identify a unique partition within the set of new partitions for the key, and inserts the key into the identified partition. Finally, it replaces the existing set of partitions with the new set of partitions, thereby reducing the number of partitions by one.

In a variation on this embodiment, if performing the operation involves coalescing a partition in the hash-partitioned index, and if the hash function does not have the prefix property, the database creates a set of new partitions to replace the set of existing partitions, wherein the number of new partitions is one less than the number of existing partitions. It then scans through all the rows in the table, obtains a key for each row, applies a new hash function to the key to identify a unique partition within the set of new partitions for the key, and inserts the key into the identified partition. Finally, it replaces the existing set of partitions with the new set of partitions, thereby reducing the number of partitions by one.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video).

Computer System

Figure 1:
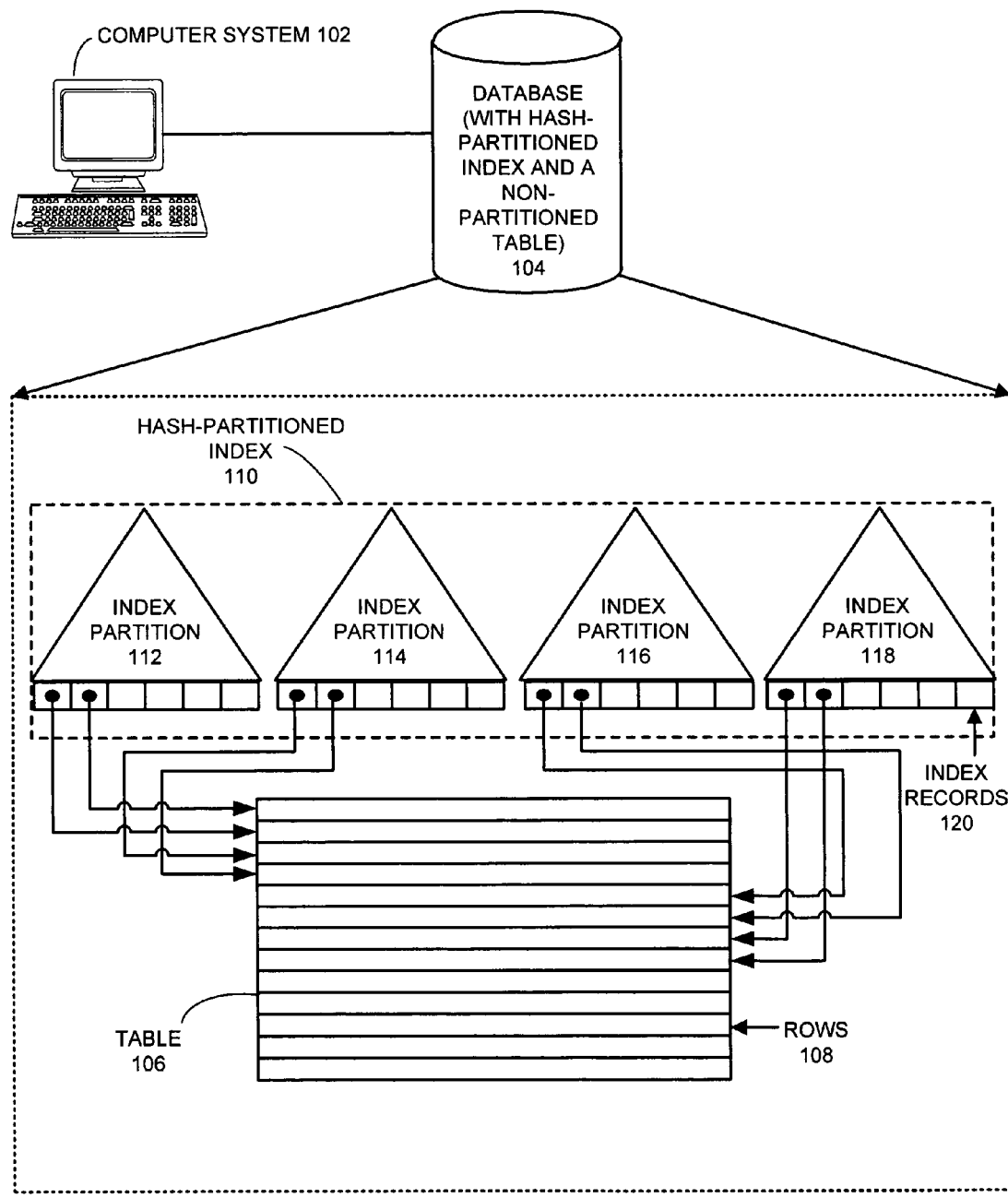
FIG. 1 illustrates a computer system with a database in accordance with an embodiment of the present invention.

FIG. 1 illustrates a computer system 102 with a database 104 in accordance with an embodiment of the present invention. Computer system 102 can generally include any type of computer system, including, but not limited to, a computer system based on a microprocessor, a mainframe computer, a digital signal processor, a portable computing device, a personal organizer, a device controller, and a computational engine within an appliance.

Database 104 can include any type of system for storing data in non-volatile storage. This includes, but is not limited to, database systems based upon magnetic, optical, and magneto-optical storage devices, as well as storage devices based on flash memory and/or battery-backed up memory. Database 104 includes a non-partitioned table 106 comprised of a collection of rows 108. Table 106 can be referenced through one or more hash-partitioned indexes, such as index 110. Note that indexes, including hash-partitioned indexes, provide a quick way to find rows with specific column values. In the absence of indexes, database 104 would have to scan through the whole table 106 in order to identify the rows 108 that match specific column values, which would be very inefficient. A hash-partitioned index contains two or more index partitions (112, 114, 116, and 118), wherein each index partition 118 contains index records 120 that identify the location of a row 108 in the table 106. Index records 120 are typically stored in a tree data structure, such as, B$^+$-tree, that uses keys to facilitate efficient lookup and insert operations.

Accessing a Table

Figure 2:
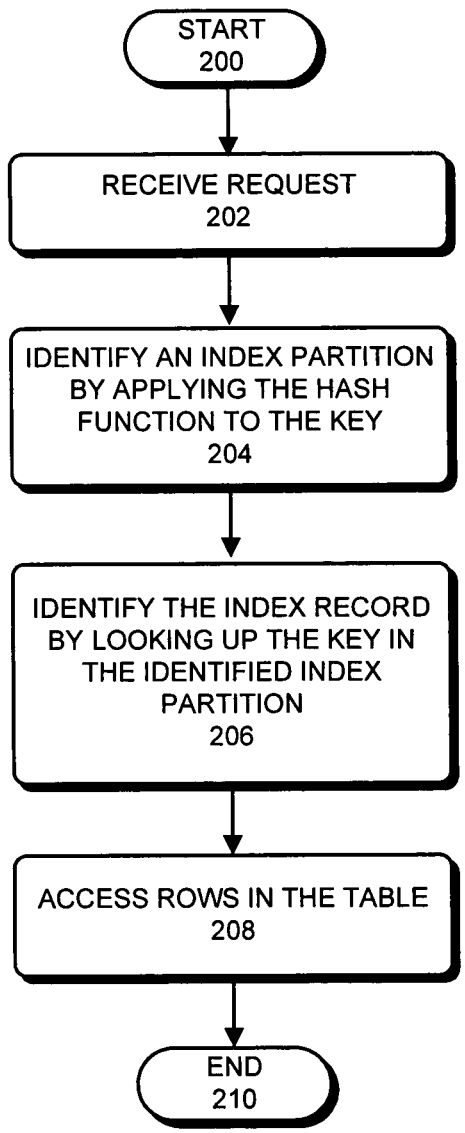
FIG. 2 presents a flow chart illustrating the process of accessing a table in accordance with an embodiment of the present invention.

FIG. 2 presents a flow chart illustrating the process of accessing a table 106 in accordance with an embodiment of the present invention. Upon receiving a request (step 202), the system identifies an index partition 118 by applying a hash function to the key (step 204). Note that the hash function distributes the keys among all the partitions (112, 114, 116, and 118), so that, typically, each partition comprises approximately the same number of keys. Next, the system uses the key to identify an index record 120 (step 206) that contains a pointer to the location of the table rows 108. Finally, the system uses the index record 120 to access the table rows 108 (step 208).

Note that, although the index 110 is hash-partitioned, table 106 may not be partitioned or may be partitioned using a different technique. For example, table 106 may be range-partitioned, as is often the case in OLTP applications. Furthermore, note that, since the index 110 is hash-partitioned, index accesses and maintenance activities are equally distributed among all the partitions (112, 114, 116, and 118), thereby eliminating the formation of a single large hotspot.

Creating a Hash-Partitioned Index

Figure 3:
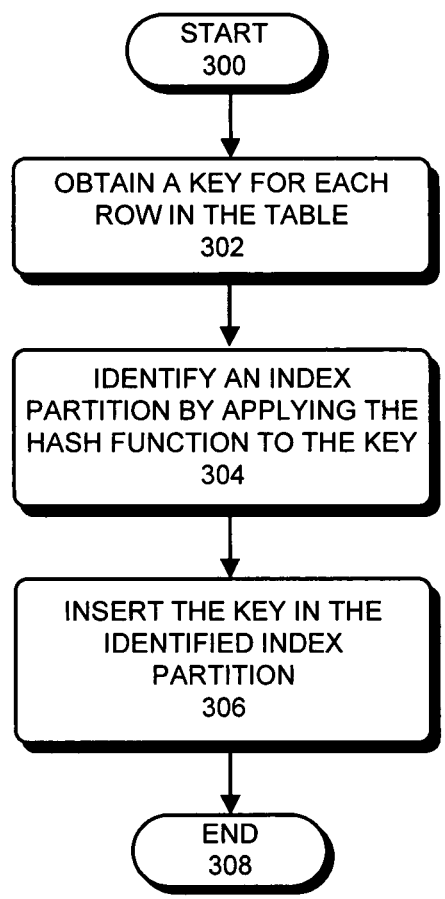
FIG. 3 presents a flow chart illustrating the process of creating a hash-partitioned index in accordance with an embodiment of the present invention.

FIG. 3 presents a flow chart illustrating the process of creating a hash-partitioned index 110 in accordance with an embodiment of the present invention. The system starts by obtaining a key for each row 108 in the table 106 (step 302). Next, the system identifies an index partition 118 by applying the hash function to the key (step 304) within the hash-partitioned index 110. Finally, the system inserts the key into the identified partition 118 (step 306).

Adding a Partition

Figure 4A:
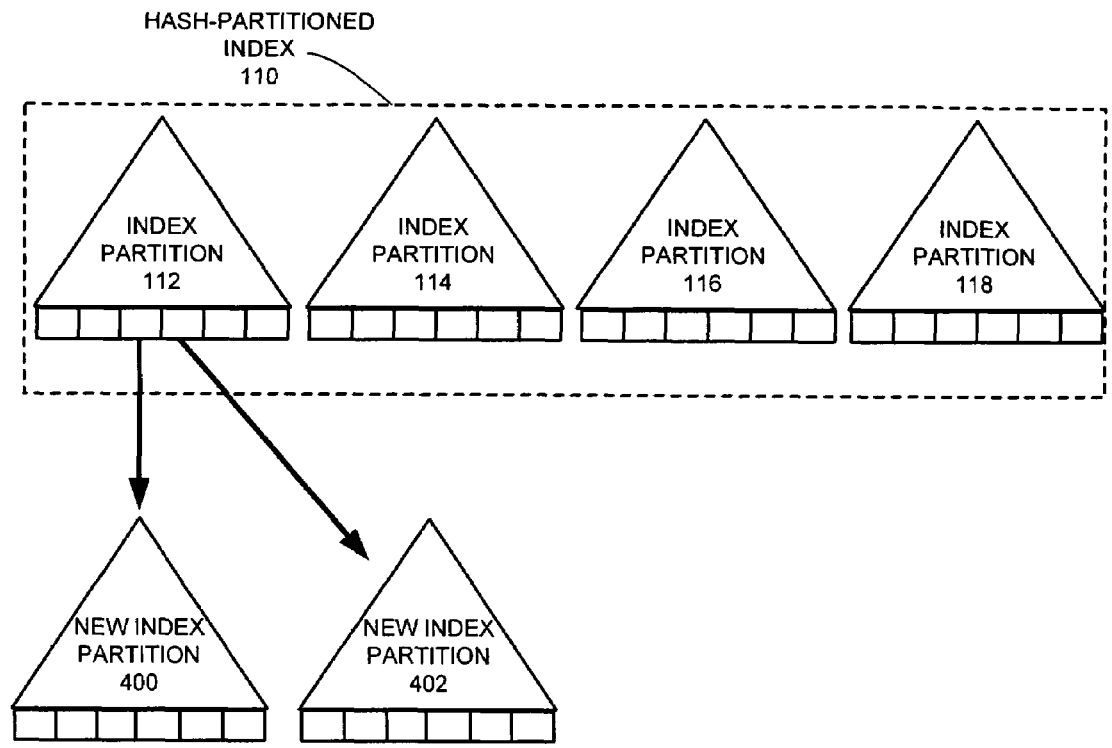
FIG. 4A and FIG. 4B illustrate how a partition is added to a hash-partitioned index, if the hash function has the prefix property, in accordance with an embodiment of the present invention.
Figure 4B:
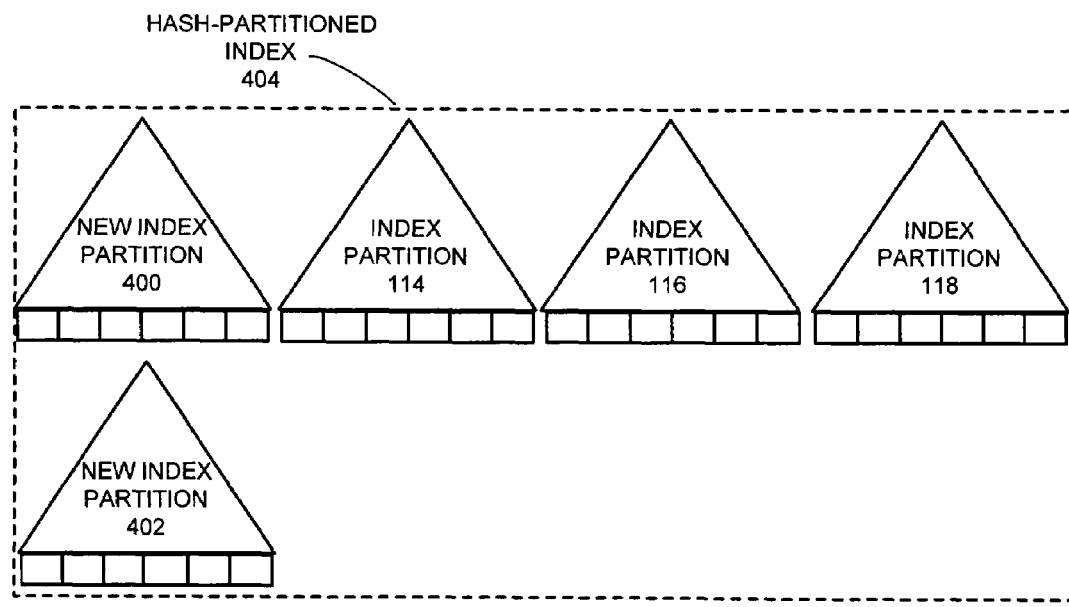

FIG. 4A and FIG. 4B illustrate how a partition is added to a hash-partitioned index 110, if the hash function has the prefix property, in accordance with an embodiment of the present invention. In FIG. 4A, a source partition 112 is subdivided to create two new partitions 400 and 402. In FIG. 4B, the source partition 112 is replaced by the two new partitions 400 and 402 to create a new hash-partitioned index 404 that comprises of one additional partition.

Figure 5:
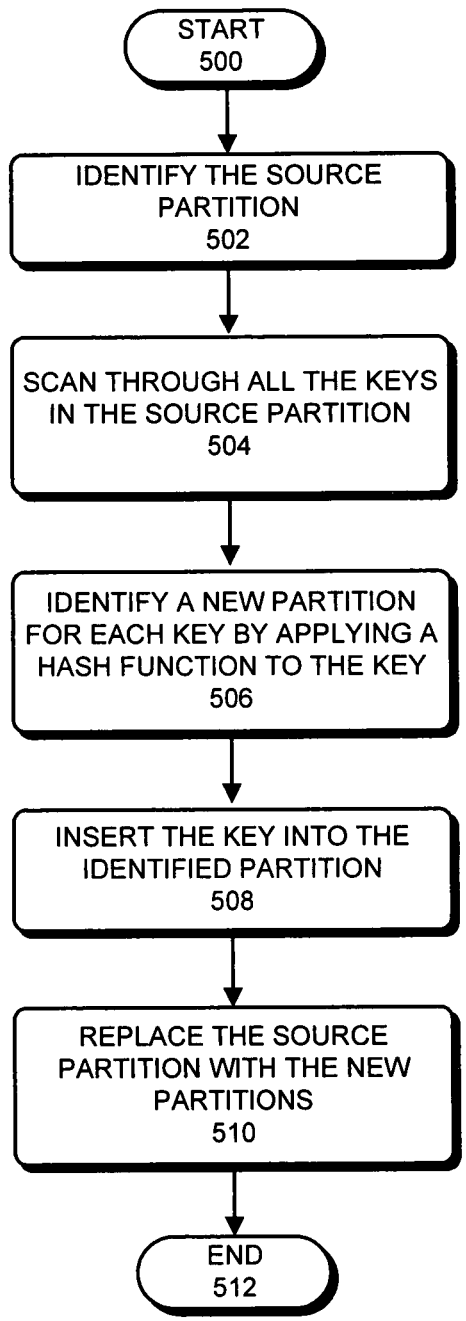
FIG. 5 presents a flow chart illustrating the process of adding a partition to a hash-partitioned index, if the hash function has the prefix property, in accordance with an embodiment of the present invention.

FIG. 5 presents a flow chart illustrating the process of adding a partition to a hash-partitioned index 110, if the hash function has the prefix property, in accordance with an embodiment of the present invention. The system identifies a source partition 112 (step 502) to be subdivided into two new partitions 400 and 402. Next, if the source partition is marked usable, the system scans through all the keys in the source partition 112 (step 504). Then, the system applies a new hash function to the key to identify one of the two new partitions 400 and 402 (step 506). Next, the system inserts the key into the identified partition (step 508). Finally, the system replaces the source partition 112 with the new partitions 400 and 402 (step 510).

Coalescing a Partition

Figure 6A:
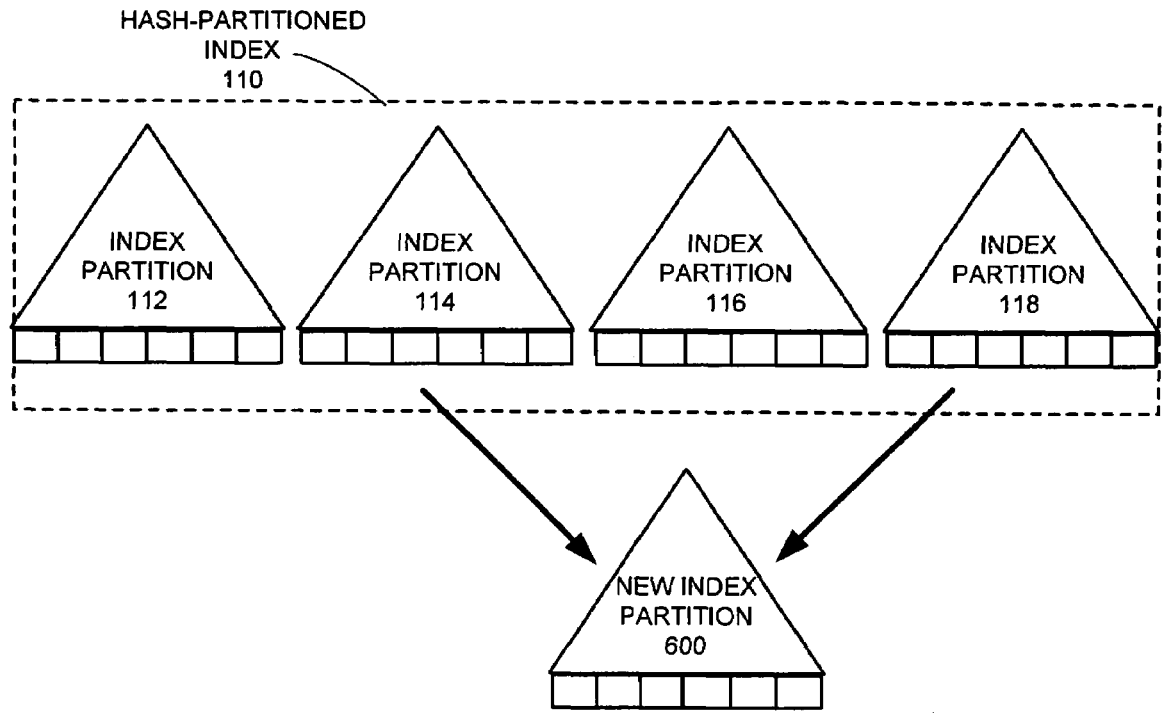
FIG. 6A and FIG. 6B illustrate how a partition is coalesced in a hash-partitioned index, if the hash function has the prefix property, in accordance with an embodiment of the present invention.
Figure 6B:
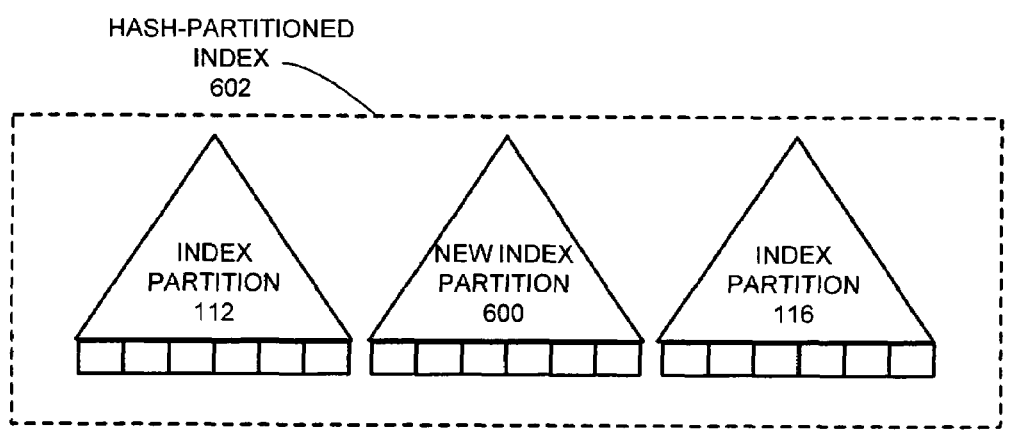

FIG. 6A and FIG. 6B illustrate how a partition is coalesced in a hash-partitioned index 110, if the hash function has the prefix property, in accordance with an embodiment of the present invention. In FIG. 6A, two source partitions 114 and 118 are coalesced to create a new partitions 600. In FIG. 4B the source partitions 114 and 118 are replaced by the new partition 600 to create a new hash-partitioned index 602 that comprises of one less partition.

Figure 7:
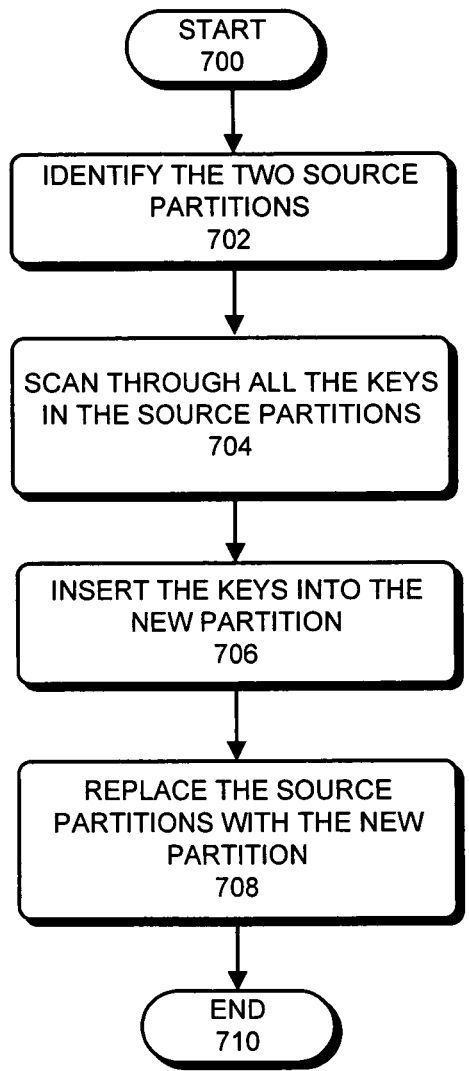
FIG. 7 presents a flow chart illustrating the process of coalescing a partition in a hash-partitioned index, if the hash function has the prefix property, in accordance with an embodiment of the present invention.

FIG. 7 presents a flow chart illustrating the process of coalescing a partition in a hash-partitioned index 110, if the hash function has the prefix property, in accordance with an embodiment of the present invention. The system identifies two source partitions 114 and 118 (step 702) to be coalesced into a single new partition 600. Next, if both of the source partitions are marked usable, the system scans through all the keys in the source partitions 114 and 118 (step 704). Then, the system inserts the keys into the new partition 600 (step 706). Finally, the system replaces the source partitions 114 and 118 with the new partition 600 (step 708).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using an index that is hash-partitioned to access a table that is not hash partitioned, executed by at least one or more processors, the method comprising:
    receiving a request at a database system to perform an operation involving the table that is not hash-partitioned:
    looking up a key in the hash-partitioned index by:
    applying a hash function to the key to identify a unique index partition; and
    using the key to perform a lookup in the identified index partition to identify a row of the table that matches the key;
    adding one or more partitions to the hash-partitioned index by subdividing a source index partition to create two new partitions and creating a set of new partitions to replace a set of existing partitions in the hash-partitioned index, wherein the set of new partitions is more than the set of existing partitions;
    scanning through all rows in the table;
    obtaining a second key for each row in the table;
    applying a new hash function to the obtained second key to identify a unique partition within the two new partitions and the set of new partitions for the obtained second key;
    inserting the obtained second key into the identified partition;
    replacing the source partition with the two new partitions; and
    replacing the existing set of partitions with the new set of partitions.

2. The method of claim 1, wherein the operation includes at least one of:
    querying the table to identify rows that match a logical condition;
    updating an existing row in the table;
    deleting an existing row from the table;
    inserting a new row into the table;
    creating a hash-partitioned index for the table;
    adding a partition to the hash-partitioned index; and
    coalescing a partition in the hash-partitioned index.

3. The method of claim 1, wherein applying the hash function to the key comprises applying the hash function to a prefix of the key, instead of the entire key.

4. The method of claim 1, wherein applying the hash function to the key to identify a unique partition for the key comprises calculating a partition number.

5. The method of claim 1, wherein if performing the operation comprises creating a hash-partitioned index, the method further comprises:
    obtaining a key for each row in the table;
    applying a hash function to the key to identify a unique partition within the hash-partitioned index for the key; and
    inserting the key into the identified partition.

6. The method of claim 1, wherein if performing the operation comprises adding a partition to the hash-partitioned index, and if the hash function has a prefix property, the method further comprises:
    identifying a source partition in the hash-partitioned index to be subdivided to create two new partitions to replace the source partition, thereby creating an additional partition;
    if the source partition is marked unusable, attempting to identify a second index, wherein the index key of the second index is a superset of the index key of the hash-partitioned index;
    if a second index is successfully identified,
        scanning through one or more keys in the second index,
        applying the hash function to each key to determine whether the key maps to the source partition,
        if the key maps to the source partition, applying a new hash function to the key to identify one of the two new partitions, and
        inserting the key into the identified new partition; and
    replacing the source partition with the two new partitions.

7. The method of claim 1, wherein if performing the operation comprises adding a partition to the hash-partitioned index, and if the hash function has a prefix property, the method further comprises:
    identifying a source partition in the hash-partitioned index to be subdivided to create two new partitions to replace the source partition, thereby creating an additional partition;
    if the source partition is marked unusable, scanning through all the rows in the table,
        obtaining a key for each row in the table,
        applying the hash function to the key to determine whether the key maps to the source partition,
        if the key maps to the source partition, applying a new hash function to the key to identify one of the two new partitions, and
        inserting the key into the identified new partition; and
    replacing the source partition with the two new partitions.

8. The method of claim 1, wherein if performing the operation comprises adding a partition to the hash-partitioned index, and if the hash function does not have a prefix property, the method further comprises:
    creating a set of new partitions to replace the set of existing partitions, wherein the number of new partitions is one greater than the number of existing partitions;
    scanning through all the keys in the existing partitions,
        applying a new hash function to each key to identify a unique partition within the set of new partitions for the key, and
        inserting the key into the identified partition; and
    replacing the existing set of partitions with the new set of partitions.

9. The method of claim 1, wherein if performing the operation comprises coalescing a partition in the hash-partitioned index, and if the hash function has a prefix property, the method further comprises:
    identifying two source partitions in the hash-partitioned index that share the same prefix to be coalesced to create a single new partition, thereby reducing the number of partitions by one;
    if both of the source partitions are marked usable, coalescing the two source partitions to create the new partition by
        scanning through all the keys in the two source partitions, and
        inserting the keys into the single new partition; and
    replacing the two source partitions with the new partition.

10. The method of claim 1, wherein if performing the operation comprises coalescing a partition to the hash-partitioned index, and if the hash function has a prefix property, the method further comprises:
    identifying two source partitions in the hash-partitioned index that share the same prefix to be coalesced to create a single new partition, thereby reducing the number of partitions by one;
    if at least one of the two source partitions is marked unusable, attempting to identify a second index, wherein the index key of the second index is a superset of the index key of the hash-partitioned index;
    if a second index is successfully identified, scanning through one or more keys in the second index,
applying the hash function to each key to determine whether the key maps to one of the source partitions, and
if the key maps to one of the source partitions, inserting the key into the identified new partition; and
replacing the source partition with the two new partitions.

11. The method of claim 1, wherein if performing the operation comprises coalescing a partition to the hash-partitioned index, and if the hash function has a prefix property, the method further comprises:
identifying two source partitions in the hash-partitioned index that share the same prefix to be coalesced to create a single new partition, thereby reducing the number of partitions by one;
if at least one of the two source partitions is marked unusable,
scanning through all the rows in the table,
obtaining a key for each row in the table,
applying the hash function to the key to determine whether the key maps to one of the source partitions, and
if the key maps to one of the source partitions, inserting the key into the identified new partition; and
replacing the source partition with the two new partitions.

12. The method of claim 1, wherein if performing the operation comprises coalescing a partition in the hash-partitioned index, and if the hash function does not have a prefix property, the method further comprises:
creating a set of new partitions to replace the set of existing partitions, wherein the number of new partitions is one less than the number of existing partitions;
scanning through all the keys in the existing partitions;
applying a new hash function to each key to identify a unique partition within the set of new partitions for the key; inserting the key into the identified partition; and
replacing the existing set of partitions with the new set of partitions.

13. The method of claim 1, wherein if performing the operation comprises coalescing a partition in the hash-partitioned index, and if the hash function does not have a prefix property, the method further comprises:
creating a set of new partitions to replace the set of existing partitions, wherein the number of new partitions is one less than the number of existing partitions;
scanning through all the rows in the table;
obtaining a key for each row in the table;
applying a new hash function to the key to identify a unique partition within the set of new partitions for the key; inserting the key into the identified partition; and
replacing the existing set of partitions with the new set of partitions.

14. The method of claim 1, wherein the hash function has a prefix property.

15. A non-transitory computer readable storage medium storing instructions that when executed by a computer cause the computer to perform a method that uses a hash partitioned index to access a table that is not hash partitioned, the method comprising:
receiving a request at a database system to perform an operation involving
the table that is not hash-partitioned;
looking up a key in the hash-partitioned index by:
applying a hash function to the key to identify a unique index partition; and
using the key to perform a lookup in the identified index partition to identify a row of the table that matches the key;
adding one or more partitions to the hash-partitioned index by subdividing a source index partition to create two new partitions and creating a set of new partitions to replace a set of existing partitions in the hash-partitioned index, wherein the set of new partitions is more than the set of existing partitions;
scanning through all rows in the table;
obtaining a second key for each row in the table;
applying a new hash function to the obtained second key to identify a unique partition within the two new partitions and the set of new partitions for the obtained second key;
inserting the obtained second key into the identified partition;
replacing the source partition with the two new partitions; and
replacing the existing set of partitions with the new set of partitions.

16. The computer-readable storage medium of claim 15, wherein the operation includes at least one of:
querying the table to identify rows that match a logical condition;
updating an existing row in the table;
deleting an existing row from the table;
inserting a new row into the table;
creating a hash-partitioned index for the table;
adding a partition to the hash-partitioned index; and
coalescing a partition in the hash-partitioned index.

17. The computer-readable storage medium of claim 15, wherein applying the hash function to the key comprises applying the hash function to a prefix of the key, instead of the entire key.

18. The computer-readable storage medium of claim 15, wherein applying the hash function to the key to identify a unique partition for the key comprises calculating a partition number.

19. The computer-readable storage medium of claim 15, wherein if performing the operation comprises creating a hash-partitioned index, the method further comprises:
obtaining a key for each row in the table;
applying a hash function to the key to identify a unique partition within the hash-partitioned index for the key; and
inserting the key into the identified partition.

20. The non-transitory computer-readable storage medium of claim 15, wherein if performing the operation comprises adding a partition to the hash partitioned index, and if the hash function has a prefix property, the method further comprises:
identifying a source partition in the hash partitioned index to be subdivided to create two new partitions to replace the source partition, thereby creating an additional partition;
if the source partition is marked unusable, attempting to identify a second index, wherein the index key of the second index is a superset of the index key of the hash partitioned index;
if a second index is successfully identified,
scanning through one or more keys in the second index;
applying the hash function to each key to determine whether the key maps to the source partition;
if the key maps to the source partition, applying a new hash function to the key to identify one of the two new partitions; and
inserting the key into the identified new partition; and
replacing the source partition with the two new partitions.

21. The non-transitory computer-readable storage medium of claim 15, wherein if performing the operation comprises adding a partition to the hash-partitioned index, and if the hash function has a prefix property, the method further comprises:
- identifying a source partition in the hash-partitioned index to be subdivided to create two new partitions to replace the source partition, thereby creating an additional partition;
- if the source partition is marked unusable,
  - scanning through all the rows in the table;
  - obtaining a key for each row in the table;
  - applying the hash function to the key to determine whether the key maps to the source partition;
  - if the key maps to the source partition, applying a new hash function to the key to identify one of the two new partitions, and inserting the key into the identified new partition; and
- replacing the source partition with the two new partitions.

22. The non-transitory computer-readable storage medium of claim 15, wherein if performing the operation comprises adding a partition to the hash-partitioned index, and if the hash function does not have a prefix property, the method further comprises:
- creating a set of new partitions to replace the set of existing partitions, wherein the number of new partitions is one greater than the number of existing partitions;
- scanning through all the keys in the existing partitions;
- applying a new hash function to each key to identify a unique partition within the set of new partitions for the key;
- inserting the key into the identified partition; and
- replacing the existing set of partitions with the new set of partitions.

23. The non-transitory computer-readable storage medium of claim 15, wherein if performing the operation comprises coalescing a partition in the hash-partitioned index, and if the hash function has a prefix property, the method further comprises:
- identifying two source partitions in the hash-partitioned index that share the same prefix to be coalesced to create a single new partition, thereby reducing the number of partitions by one;
- if both of the source partitions are marked usable, coalescing the two source partitions to create the new partition by scanning through all the keys in the two source partitions, and inserting the keys into the single new partition; and
- replacing the two source partitions with the new partition.

24. The non-transitory computer-readable storage medium of claim 15, wherein if performing the operation comprises coalescing a partition to the hash-partitioned index, and if the hash function has a prefix property, the method further comprises:
- identifying two source partitions in the hash-partitioned index that share the same prefix to be coalesced to create a single new partition, thereby reducing the number of partitions by one;
- if at least one of the two source partitions is marked unusable, attempting to identify a second index, wherein the index key of the second index is a superset of the index key of the hash-partitioned index;
- if a second index is successfully identified,
  - scanning through one or more keys in the second index,
  - applying the hash function to each key to determine whether the key maps to one of the source partitions, and
  - if the key maps to one of the source partitions, inserting the key into the identified new partition; and
- replacing the source partition with the two new partitions.

25. The non-transitory computer-readable storage medium of claim 15, wherein if performing the operation comprises coalescing a partition to the hash-partitioned index, and if the hash function has a prefix property, the method further comprises:
- identifying two source partitions in the hash-partitioned index that share the same prefix to be coalesced to create a single new partition, thereby reducing the number of partitions by one;
- if at least one of the two source partitions is marked unusable,
  - scanning through all the rows in the table,
  - obtaining a key for each row in the table,
  - applying the hash function to the key to determine whether the key maps to one of the source partitions, and
  - if the key maps to one of the source partitions, inserting the key into the identified new partition; and
- replacing the source partition with the two new partitions.

26. The non-transitory computer-readable storage medium of claim 15, wherein if performing the operation comprises coalescing a partition in the hash-partitioned index, and if the hash function does not have a prefix property, the method further comprises:
- creating a set of new partitions to replace the set of existing partitions, wherein the number of new partitions is one less than the number of existing partitions;
- scanning through all the keys in the existing partitions;
- applying a new hash function to each key to identify a unique partition within the set of new partitions for the key;
- inserting the key into the identified partition; and
- replacing the existing set of partitions with the new set of partitions.

27. The non-transitory computer-readable storage medium of claim 1 9, wherein if performing the operation comprises coalescing a partition in the hash-partitioned index, and if the hash function does not have a prefix property, the method further comprises:
- creating a set of new partitions to replace the set of existing partitions, wherein the number of new partitions is one less than the number of existing partitions;
- scanning through all the rows in the table;
- obtaining a key for each row in the table;
- applying a new hash function to the key to identify a unique partition within the set of new partitions for the key;
- inserting the key into the identified partition; and
- replacing the existing set of partitions with the new set of partitions.

28. The non-transitory computer-readable storage medium of claim 15, wherein the hash function has a prefix property.

29. An apparatus for using an index that is hash-partitioned to access a table that is not hash-partitioned comprising:
- a database system;
- a processor;
- a receiving mechanism that receives requests to perform an operation involving a table in the table that is not hash-partitioned;
- a lookup mechanism that looks up a key in the hash-partitioned index by: applying the hash function to the key to identify a unique index partition, and use the key to perform a lookup in the identified index partition to identify a row of the table that matches the key; and a index-partition adding mechanism that adds one or more partitions to the hash partitioned index by subdividing a source index partition to create two new partitions and creating a set of new partitions to replace a set of existing partitions in the hash-partitioned index, wherein the set of new partitions is more than the set of existing partitions, and wherein the index-partition added mechanism is further configured to:

scanning through all rows in the table;

obtaining a second key for each row in the table;

applying a new hash function to the obtained second key to identify a unique partition within the two new partitions and the set of new partitions for the obtained second key;

inserting the obtained second key into the identified partition;

replacing the source partition with the two new partitions; and replacing the existing set of partitions with the new set of partitions.

30. The apparatus of claim 29, wherein the operation includes at least one of:

query the table to identify rows that match a logical condition;

updating an existing row in the table;

deleting an existing row from the table;

inserting a new row into the table;

creating a hash-partitioned index for the table;

adding a partition to the hash-partitioned index; and coalescing a partition in the hash-partitioned index.

31. The apparatus of claim 29, wherein the lookup means is further configured to apply the hash function to a prefix of the key, instead of the entire key.

32. The apparatus of claim 29, wherein the lookup means is further configured to calculate a partition number.

33. The apparatus of claim 29, wherein the apparatus further comprises an index creating mechanism, wherein if the operation comprises creating a hash-partitioned index, the index creation mechanism:

obtain a key for each row in the table, apply a hash function to the key to identify a unique partition within the hash-partitioned index for the key, and to insert the key into the identified partition.

34. The apparatus of claim 29, wherein the apparatus further comprises an index addition mechanism, wherein if performing the operation comprises adding a partition to the hash-partitioned index, and if the hash function has a prefix property, the index addition mechanism:

identifies a source partition in the hash-partitioned index to be subdivided to create two new partitions to replace the source partition, thereby creating an additional partition;

if the source partition is marked unusable, attempts to identify a second index, wherein the index key of the second index is a superset of the index key of the hash-partitioned index;

if a second index is successfully identified, scans through one or more keys in the second index, applies the hash function to each key to determine whether the key maps to the source partition, if the key maps to the source partition, applies a new hash function to the key to identify one of the two new partitions, and to insert the key into the identified new partition; and replaces the source partition with the two new partitions.

35. The apparatus of claim 29, wherein the apparatus further comprises an index addition mechanism, wherein if performing the operation comprises adding a partition to the hash-partitioned index, and if the hash function has a prefix property, the index addition mechanism:

identifies a source partition in the hash-partitioned index to be subdivided to create two new partitions to replace the source partition, thereby creating an additional partition;

if the source partition is marked unusable, scans through all the rows in the table, obtains a key for each row in the table, applies the hash function to the key to determine whether the key maps to the source partition, if the key maps to the source partition, applies a new hash function to the key to identify one of the two new partitions, and to insert the key into the identified new partition; and replaces the source partition with the two new partitions.

36. The apparatus of claim 29, wherein the apparatus further comprises an index creating mechanism, wherein if performing the operation comprises adding a partition to the hash-partitioned index, and if the hash function does not have a prefix property, the index creating mechanism:

creates a set of new partitions to replace the set of existing partitions, wherein the number of new partitions is one greater than the number of existing partitions;

scans through all the keys in the existing partitions;

applies a new hash function to each key to identify a unique partition within the set of new partitions for the key;

inserts the key into the identified partition; and replaces the existing set of partitions with the new set of partitions.

37. The apparatus of claim 29, wherein the apparatus further comprises a coalescing mechanism, wherein if performing the operation comprises coalescing a partition in the hash-partitioned index, and if the hash function has a prefix property, the coalescing mechanism:

identifies two source partitions in the hash-partitioned index that share the same prefix to be coalesced to create a single new partition, thereby reducing the number of partitions by one;

if both of the source partitions are marked usable, scans through all the keys in the two source partitions and inserts the keys into the single new partition; and replaces the two source partitions with the new partition.

38. The apparatus of claim 29, wherein the apparatus further comprises a coalescing mechanism, wherein if performing the operation comprises coalescing a partition in the hash-partitioned index, and if the hash function has a prefix property, the coalescing mechanism:

identifies two source partitions in the hash-partitioned index that share the same prefix to be coalesced to create a single new partition, thereby reducing the number of partitions by one;

if at least one of the two source partitions is marked unusable, attempts to identify a second index, wherein the index key of the second index is a superset of the index key of the hash-partitioned index;

if a second index is successfully identified, scans through one or more keys in the second index, applies the hash function to each key to determine whether the key maps to one of the source partitions, and if the key maps to one of the source partitions, inserts the key into the new partition; and replaces the two source partitions with the new partition.

39. The apparatus of claim 29, wherein the apparatus further comprises a coalescing mechanism, wherein if performing the operation comprises coalescing a partition in the hash-partitioned index, and if the hash function has a prefix property, the coalescing mechanism:

identifies two source partitions in the hash-partitioned index that share the same prefix to be coalesced to create a single new partition, thereby reducing the number of partitions by one;

if at least one of the two source partitions is marked unusable, the coalescing mechanism further:

scans through all the rows in the table;

obtains a key for each row in the table;

applies the hash function to the key to determine whether the key maps to one of the source partitions;

if the key maps to one of the source partitions, inserts the key into the new partition; and replaces the two source partitions with the new partition.

40. The apparatus of claim 29, wherein the apparatus further comprises a coalescing mechanism, wherein if performing the operation comprises coalescing a partition in the hash-partitioned index, and if the hash function does not have a prefix property, the coalescing mechanism:

creates a set of new partitions to replace the set of existing partitions, wherein the number of new partitions is one less than the number of existing partitions;

scans through all the keys in the existing partitions;

applies a new hash function to each key to identify a unique partition within the set of new partitions for the key;

inserts the key into the identified partition; and replaces the existing set of partitions with the new set of partitions.

41. The apparatus of claim 29, wherein the apparatus further comprises a coalescing mechanism, wherein if performing the operation comprises coalescing a partition in the hash-partitioned index, and if the hash function does not have a prefix property, the coalescing mechanism:

creates a set of new partitions to replace the set of existing partitions, wherein the number of new partitions is one less than the number of existing partitions;

scans through all the rows in the table;

obtains a key for each row in the table;

applies a new hash function to the key to identify a unique partition within the set of new partitions for the key;

inserts the key into the identified partition; and replaces the existing set of partitions with the new set of partitions.

42. The apparatus of claim 29, wherein the hash function has a prefix property.

* * * * *

UNITED STATES PATENT AND TRADEMARK OFFICE
CERTIFICATE OF CORRECTION

| | | |
|---|---|---|
| PATENT NO. | : 8,583,657 B2 | Page 1 of 1 |
| APPLICATION NO. | : 10/857650 | |
| DATED | : November 12, 2013 | |
| INVENTOR(S) | : Shukla | |

It is certified that error appears in the above-identified patent and that said Letters Patent is hereby corrected as shown below:

In the Specification

In column 5, line 26, delete "video)." and insert -- video discs). --, therefor.

In the Claims

In column 7, line 6, in Claim 1, delete "partitioned:" and insert -- partitioned; --, therefor.

In column 10, line 21, in Claim 16, delete "The" and insert -- The non-transitory --, therefor.

In column 10, line 31, in Claim 17, delete "The" and insert -- The non-transitory --, therefor.

In column 10, line 35, in Claim 18, delete "The" and insert -- The non-transitory --, therefor.

In column 10, line 39, in Claim 19, delete "The" and insert -- The non-transitory --, therefor.

In column 12, line 40, in Claim 27, delete "1 9," and insert -- 15, --, therefor.

In column 12, line 61, in Claim 29, delete "a table in the" and insert -- the --, therefor.

In column 13, line 29-30, in Claim 31, delete "means is further configured to apply" and insert -- mechanism further applies --, therefor.

In column 13, line 32-33, in Claim 32, delete "means is further configured to calculate" and insert -- mechanism further calculates --, therefor.

In column 13, line 38, in Claim 33, delete "obtain" and insert -- obtains --, therefor.

In column 13, line 39, in Claim 33, delete "apply" and insert -- applies --, therefor.

Signed and Sealed this
Eighth Day of September, 2015

Michelle K. Lee
*Director of the United States Patent and Trademark Office*